(12) United States Patent
Clift

(10) Patent No.: US 6,864,664 B2
(45) Date of Patent: Mar. 8, 2005

(54) CIRCUIT FOR CHARGING SUPPLEMENTAL BATTERY IN PORTABLE ELECTRONIC DEVICE

(75) Inventor: Graham Clift, Poway, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 73 days.

(21) Appl. No.: 10/455,896

(22) Filed: Jun. 6, 2003

(65) Prior Publication Data
US 2004/0257039 A1 Dec. 23, 2004

(51) Int. Cl.[7] .............................................. H01M 10/46
(52) U.S. Cl. ...................................................... 320/128
(58) Field of Search ................................. 320/103, 112, 320/127, 128, 137, 162; 323/273, 274, 281

(56) References Cited

U.S. PATENT DOCUMENTS

| | | | |
|---|---|---|---|
| 4,539,490 A | 9/1985 | Ariizumi et al. | 307/296 R |
| 4,695,745 A | 9/1987 | Mimoto et al. | 307/297 |
| 5,003,197 A | 3/1991 | Nojima et al. | 307/296.2 |
| 5,347,172 A | 9/1994 | Cordoba et al. | 307/296.2 |
| 5,513,091 A | 4/1996 | Uchida et al. | 363/60 |
| 5,680,300 A | 10/1997 | Szepesi et al. | 363/59 |
| 5,754,417 A | 5/1998 | Nicollini | 363/60 |
| 5,932,990 A | 8/1999 | Kaneko | 320/122 |
| 5,955,797 A | 9/1999 | Kim | 307/150 |
| 6,226,193 B1 | 5/2001 | Bayer et al. | 363/59 |
| 6,242,970 B1 | 6/2001 | Grant et al. | 327/536 |
| 6,462,523 B1 * | 10/2002 | Wannenmacher | 323/282 |
| 6,549,064 B2 | 4/2003 | Bandy et al. | 327/536 |
| 6,710,585 B2 * | 3/2004 | Schmitt et al. | 323/281 |
| 2002/0109540 A1 | 8/2002 | Meng | 327/536 |
| 2002/0149416 A1 | 10/2002 | Bandy et al. | 327/536 |
| 2003/0085758 A1 | 5/2003 | Rader et al. | 327/536 |

* cited by examiner

Primary Examiner—Edward H. Tso
(74) Attorney, Agent, or Firm—John L. Rogitz

(57) ABSTRACT

A charge pump IC and LDO are provided between the main power supply of a portable electronic device and a supplemental battery to control charge current and voltage to the supplemental battery using a small internally-packaged circuit.

28 Claims, 1 Drawing Sheet

SUPPLEMENTAL
BATTERY CHARGING
CIRCUITRY

CIRCUIT FOR CHARGING SUPPLEMENTAL BATTERY IN PORTABLE ELECTRONIC DEVICE

FIELD OF THE INVENTION

The present invention relates generally to battery charging for portable electronic devices.

BACKGROUND OF THE INVENTION

Portable electronic devices such as personal digital assistants (PDAs), wireless telephones, and the like typically have rechargeable batteries for powering the devices. Because such devices from time to time temporarily require the provision of higher than the normal current supplied by the main battery, e.g., during certain periods of wireless transmission of data, supplemental batteries might be provided to make up the difference.

For such systems, the supplemental batteries typically are recharged using the main battery during periods of low current demand. This presents challenges, particularly in the case of Lithium ion (Li-ion) supplemental batteries which are increasingly popular due to the fact that they can be made very thin and, hence, supportable on an integrated circuit (IC) card within the portable electronic device. With more specificity, Li-ion batteries require a constant charging current until a charge voltage (e.g., 4.2 volts), is reached, at which time it is desirable to provide a constant voltage to the battery to complete the charge. But when the main battery is at a low voltage, providing this kind of charging profile can require the use of a relatively large boost regulator so that the charge current to the supplemental battery will not exceed its design limit. This consumes valuable space in what is designed to be a small electronic device, and moreover represents a relatively high added cost. The alternative is to use a wall charger, which can be impractical to use under many circumstances. There is thus a need to provide a circuit, which is internal to a portable electronic device, to limit charge current to a supplemental battery, without requiring the use of a relatively bulky boost regulator.

SUMMARY OF THE INVENTION

A circuit for charging a supplemental battery of a portable electronic device that has a main power supply includes a charge pump integrated circuit (IC) receiving voltage from the main power supply, and a low drop out linear regulator (LDO) receiving voltage from the charge pump IC and outputting voltage to the supplemental battery.

In a preferred embodiment, the supplemental battery is a Lithium ion (Li-ion) battery. The charge pump IC and LDO may be contained on a single substrate that is mounted on a housing of the portable electronic device.

If desired, a switch, such as a field effect transistor (FET), may be provided between the charge pump IC and the LDO for selectively adding resistance to the circuit. In this preferred embodiment a microcontroller can be provided for sending a pre-charge signal to the FET to add resistance into the circuit based at least in part on a voltage of the supplemental battery. The microcontroller can also be electrically connected to the charge pump IC to send a control signal thereto based at least in part on a voltage of the supplemental battery.

In another aspect, a portable electronic device includes a primary power source, a supplemental power source, and charging means internal to the device for controlling the charging of the supplemental power source. As set forth further below, the charging means includes constant current means coupled to maximum voltage means for providing a constant current to the supplemental power source up to a first voltage, and then providing constant voltage to the supplemental power source.

In still another aspect, a portable electronic device with electronic circuitry includes a main battery powering at least portions of the circuitry, and a supplemental battery powering at least portions of the circuitry at least from time to time. A current limiting device limits the charge current to the supplemental battery to no more than a maximum charge current. Also, a voltage limiting device limits a charge voltage to the supplemental battery to no more than a maximum charge voltage.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
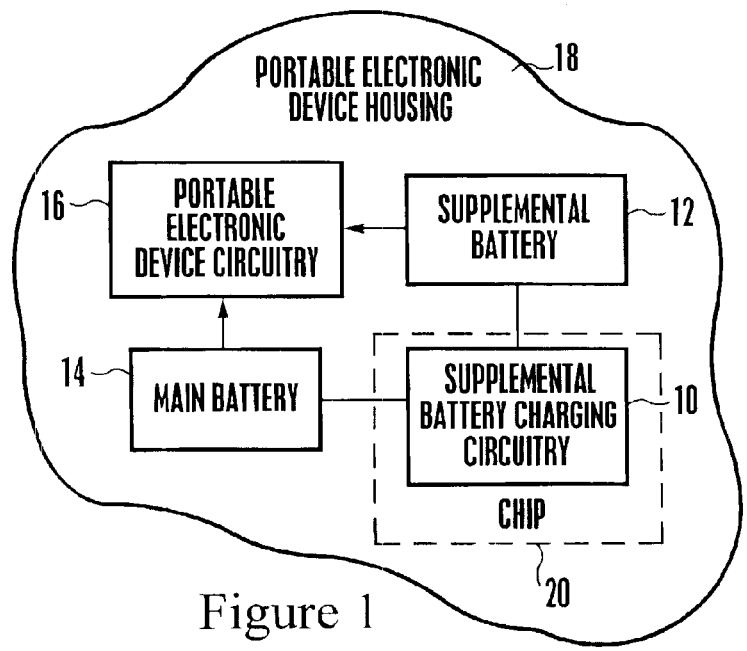
FIG. 1 is a schematic diagram showing a portable electronic device incorporating the present circuit for charging a supplemental battery.

Referring initially to FIG. 1, a circuit 10 is shown for controlling the charging of a rechargeable supplemental battery 12 that is mounted, along with a main battery 14 that can potentially supply one or more voltage regulators 15 that in turn supply portable electronic device circuitry 16, on a portable electronic device housing 18. If desired, the below-described components of the charge circuitry 10 can be mounted on a single chip or substrate 20. The chip 20 could be housed with the supplemental battery 12 in module form to establish a self-contained battery with embedded charging circuitry. The batteries 12, 14 provide main and supplemental power to the device circuitry 16 as required by the particular type of portable electronic device in accordance with principles known in the art.

The portable electronic device may be any device requiring both a main battery and a supplemental battery. By way of non-limiting example, the device may be a portable digital assistant (PDA), wireless telephone or modem, either standalone or incorporated into a PDA, laptop computer, and the like. The preferred non-limiting supplemental battery 12 is a Lithium-ion (Li-ion) battery, and more preferably a Lithium Polymer battery, that can be rated at one hundred twenty milli Ampere-hours (120 mA-hr) or more, or as low as 70 mA-hr, in which case the below-mentioned current of 60 mA would be reduced to 35A.

Figure 2:
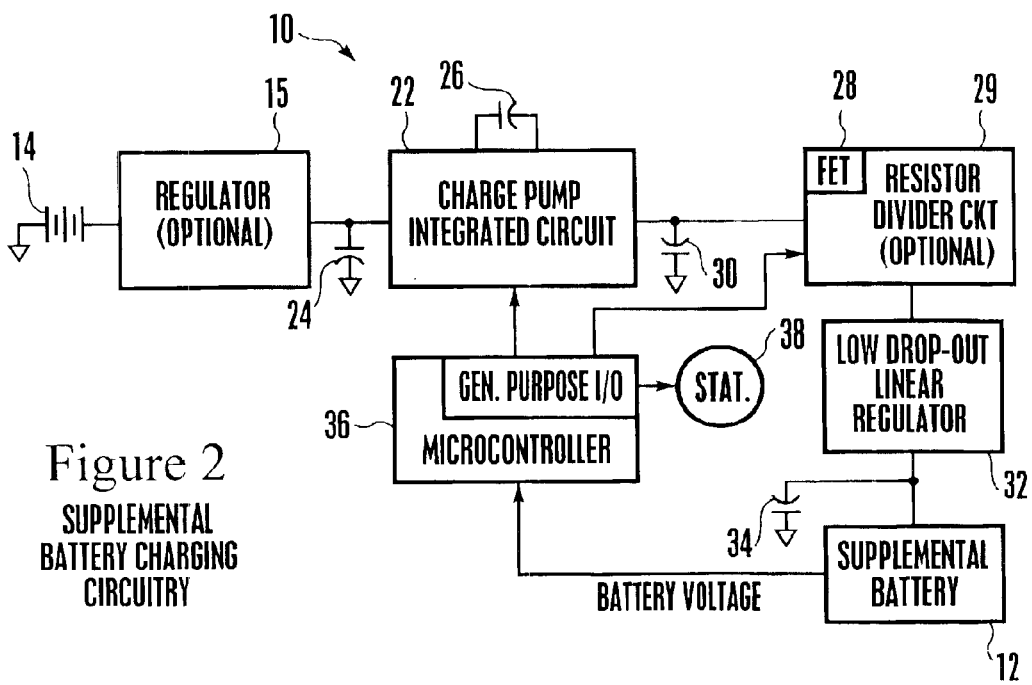
FIG. 2 is a schematic diagram showing the presently preferred circuit for charging a supplemental battery.

Now referring to FIG. 2, the charge circuitry 10 includes a charge pump integrated circuit (IC) 22 that is electrically connected to the main battery 14. A grounded capacitor 24 may be provided in parallel with the charge pump IC 22, i.e., with one side connected to the line between the main battery 14 and charge pump IC 22. Also, a shunt capacitor 26 may be provided on the charge pump IC 22.

The charge pump IC may be any appropriate high impedance charge pump that provides small currents at boosted voltage. Representative charge pump circuits are introduced by John W. Poulton in, "Digital System Engineering", pp.

626–627, Cambridge University Press, 1998. Furthermore, the following U.S. patents, all of which are incorporated herein by reference, disclose various nonlimiting charge pumps: U.S. Pat. Nos. 5,473,283, 6,552,397, 6,549,064, and 6,535,051. In a particularly preferred non-limiting embodiment, the charge pump IC 22 may be a 4.75 volt model no. MAX1686 made by Maxim, which outputs up to sixty milliamperes (60 mA) of charge current.

A field effect transistor (FET) 28 with associated resistor divider circuitry 29 may be electrically connected to the charge pump IC 22 as desired for pre-charge current regulation as set forth further below. A grounded capacitor 30 can have one side connected to the line between the charge pump IC 22 and FET 28 as shown.

A low drop out linear regulator (LDO) 32 is electrically connected to the charge pump IC 22 (through the FET 28 when a FET is provided), with the LDO 32 outputting voltage to the supplemental battery 12, potentially through a resistor when no microcontroller is provided to allow the supplemental battery 12 to be floated indefinitely at 4.2V to allow for LDO tolerances. The LDO 32 functions to regulate the voltage to the supplemental battery during the final stages of charging, and more particularly to set the upper limit of the voltage applied to the supplemental battery 12. In a preferred non-limiting embodiment, the LDO 32 outputs no more than 4.2 volts. The LDO 32 may be a model MIC79050 LDO made by Micrel. A grounded capacitor 34 can have one side connected to the line between the LDO 32 and supplemental battery 12 as shown.

In a preferred non-limiting embodiment, a microcontroller 36 may be provided which receives, through appropriate analog to digital conversion circuitry, a signal representative of battery voltage from the supplemental battery 12 and which outputs a charge control signal to the charge pump IC 22 through an available general purpose input/output (I/O) terminal as shown to control the charge pump IC 22 based on the supplemental battery voltage. Specifically, when the signal from the supplemental battery 12 to the microcontroller 36 indicates a low voltage, the microcontroller 36 causes the charge pump IC 22 to limit current, producing a constant charging current (of, e.g., 60 mA) to the supplemental battery 12. As the voltage of the supplemental battery 12 approaches the output voltage of the LDO 32, the charge current requirement decreases, with the microcontroller 36 controlling the charge pump IC 22 to permit the LDO 32 to regulate voltage to the supplemental battery 12 during the final stages of the charge.

The microcontroller 36 may also provide a pre-charge control signal to the FET 28 through an available general purpose I/O terminal so that, for instance, if the voltage of the supplemental battery 12 is excessively low, potentially meaning that the battery 12 would not initially be capable of adequately receiving the full charge current, the FET 28 would act as a switch in the resistor divider circuit 29 to add resistance to the circuit, limiting the charge current until the voltage of the supplemental battery 12 rose to a sufficiently high level to facilitate provision of the full charge current to the battery 12. At this point the pre-charge signal generated by the microcontroller 36 would cause the FET 28 to change configuration to remove resistance from the circuit 10. An I/O terminal of the microcontroller 36 may drive a status indicator 38 such as an LED or digital read-out or other indicator, indicating the voltage of the supplemental battery 12.

In any case, it may now be appreciated that the circuit 10 is not inductive but rather is capacitive based.

As an alternative to the microcontroller 36, voltage level comparators could be used for automatic charging control or for battery status indication and charge control. The voltage comparator could make use of the voltage difference between charge pump IC 22 output and the output voltage of the LDO 32 near the end of the charge to provide a clean cut-off. This would benefit from about a one volt hysteresis applied to the comparator before charging begins.

While the particular CIRCUIT FOR CHARGING SUPPLEMENTAL BATTERY IN PORTABLE ELECTRONIC DEVICE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

I claim:

1. A circuit for charging a supplemental battery of a portable electronic device providing a main power supply, comprising:
   a charge pump integrated circuit (IC) receiving voltage from the main power supply; and
   a low drop out linear regulator (LDO) receiving voltage from the charge pump IC and outputting voltage to the supplemental battery.

2. The circuit of claim 1, comprising the supplemental battery, wherein the supplemental battery is a Lithium ion (Li-ion) battery.

3. The circuit of claim 1, comprising the supplemental battery, wherein the charge pump IC and LDO are contained on a single substrate.

4. The circuit of claim 3, wherein the substrate is mounted on a housing of the portable electronic device.

5. The circuit of claim 1, wherein the circuit is capacitive based.

6. The circuit of claim 1, further comprising a switch between the charge pump IC and the LDO for selectively adding resistance to the circuit.

7. The circuit of claim 6, wherein the switch is a field effect transistor (FET).

8. The circuit of claim 7, further comprising a microcontroller for sending a pre-charge signal to the FET to add resistance into the circuit based at least in part on a voltage of the supplemental battery.

9. The circuit of claim 1, further comprising a microcontroller electrically connected to the charge pump IC to send a control signal thereto based at least in part on a voltage of the supplemental battery.

10. The circuit of claim 3, wherein the substrate is housed with the supplemental battery in module form to establish a self-contained battery assembly with embedded charging circuitry.

11. A portable electronic device, comprising:
   at least one primary power source;
   at least one supplemental power source;
   charging means internal to the device for controlling the charging of the supplemental power source, the charging means including constant current means coupled to maximum voltage means for providing a constant current to the supplemental power source up to a first voltage, and then providing constant voltage to the supplemental power source.

12. The device of claim 11, wherein the charging means does not include an inductive-based boost regulator.

13. The device of claim 11, wherein the constant current means includes a charge pump integrated circuit (IC) receiving voltage from the primary voltage source, and the maximum voltage means includes a low drop out linear regulator (LDO) receiving voltage from the charge pump IC and outputting voltage to the supplemental power source.

14. The device of claim 13, wherein the supplemental power source is a Lithium ion (Li-ion) battery.

15. The device of claim 13, wherein the charge pump IC and LDO are contained on a single substrate.

16. The device of claim 15, wherein the substrate is mounted on a housing of the portable electronic device.

17. The device of claim 15, wherein the substrate is housed with the supplemental battery in module form to establish a self-contained battery assembly with embedded charging circuitry.

18. The device of claim 13, further comprising a switch between the charge pump IC and the LDO for selectively adding resistance to the circuit.

19. The device of claim 18, wherein the switch is a field effect transistor (FET).

20. The device of claim 19, further comprising a microcontroller for sending a pre-charge signal to the FET to add resistance into the circuit based at least in part on a voltage of the supplemental power source.

21. The device of claim 13, further comprising a microcontroller electrically connected to the charge pump IC to send a control signal thereto based at least in part on a voltage of the supplemental power source.

22. A portable electronic device, comprising:
   electronic circuitry;
   a main battery powering at least portions of the circuitry;
   a supplemental battery powering at least portions of the circuitry at least from time to time;
   a current limiting device limiting a charge current to the supplemental battery to no more than a maximum charge current; and
   a voltage limiting device limiting a charge voltage to the supplemental battery to no more than a maximum charge voltage.

23. The device of claim 22, wherein the current limiting device is a charge pump integrated circuit (IC) receiving voltage from the main battery, and the voltage limiting device is a low drop out linear regulator (LDO) receiving voltage from the charge pump IC and outputting voltage to the supplemental battery.

24. The device of claim 23, wherein the supplemental battery is a Lithium ion (Li-ion) battery.

25. The device of claim 23, wherein the charge pump IC and LDO are contained on a single substrate mounted on a housing of the portable electronic device.

26. The device of claim 23, wherein the substrate is housed with the supplemental battery in module form to establish a self-contained battery assembly with embedded charging circuitry.

27. The device of claim 23, further comprising a field effect transistor (FET) and a microcontroller for sending a pre-charge signal to the FET to add resistance into the circuit based at least in part on a voltage of the supplemental battery.

28. The device of claim 23, further comprising a microcontroller electrically connected to the charge pump IC to send a control signal thereto based at least in part on a voltage of the supplemental battery.

* * * * *